US012216813B2

(12) United States Patent
Guionnet et al.

(10) Patent No.: US 12,216,813 B2
(45) Date of Patent: Feb. 4, 2025

(54) MERGING MULTIMODAL MULTIUSER INTERACTIONS

(71) Applicant: Orange, Issy-les-Moulineaux (FR)

(72) Inventors: Chantal Guionnet, Chatillon (FR); Hélène Joucla, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/325,916

(22) Filed: May 30, 2023

(65) Prior Publication Data

US 2023/0384858 A1    Nov. 30, 2023

(30) Foreign Application Priority Data

May 31, 2022   (FR) ..................................... 2205197

(51) Int. Cl.
*G06F 3/01*   (2006.01)
(52) U.S. Cl.
CPC .................................. *G06F 3/011* (2013.01)
(58) Field of Classification Search
None
See application file for complete search history.

(56) References Cited

U.S. PATENT DOCUMENTS

| 2012/0047574 | A1 | 2/2012 | Kim et al. |
| 2013/0241834 | A1* | 9/2013 | Vennelakanti ........ G06F 40/253 |
| | | | 345/158 |
| 2018/0046851 | A1 | 2/2018 | Kienzle et al. |

FOREIGN PATENT DOCUMENTS

WO   WO 2012/066557 A1   5/2012

OTHER PUBLICATIONS

French Search Report for French Application No. FR 2205197 dated Jan. 23, 2023.
French Written Opinion for French Application No. FR 2205197 dated Jan. 26, 2023.

* cited by examiner

*Primary Examiner* — Christopher J Kohlman
(74) *Attorney, Agent, or Firm* — Knobbe, Martens, Olson & Bear, LLP

(57) ABSTRACT

A processing method for a request for a digital service in an interactive environment, where the method includes: generating an enriched request based on an interpretation of signals received from a multimodal set of human-machine interactions resulting from human-machine interactions coming from coordinated actions of a plurality of distinct users in the interactive environment, where each human-machine interaction, considered individually, is only indicative of one simple request and where the enriched request triggers sending at least one command.

16 Claims, 6 Drawing Sheets

MERGING MULTIMODAL MULTIUSER INTERACTIONS

CROSS-REFERENCE TO RELATED APPLICATIONS

This application claims foreign priority to French Patent Application No. FR 2205197, entitled "MERGING MULTIMODAL MULTIUSER INTERACTIONS" and filed May 31, 2022, the content of which is incorporated by reference herein in its entirety.

BACKGROUND

Field

The present disclosure relates to the field of human-machine interactions.

More specifically, the present disclosure relates to a processing method for a request for a digital service, a computer program comprising instructions for executing such a method, and a terminal for implementing such a method.

Description of the Related Art

The multimodality in current digital services serves to allow users of a service to interact therewith by using one or more modalities among the set of modalities managed by the service. Thus for entering interactions, the user may choose for example touch or voice for issuing their requests.

In more advanced digital services, methods for merging the interaction modalities serve to make several interaction modalities cooperate at the same time for a single and unique transfer of information, meaning one command from the user, and merge in consideration of various types of cooperation of modalities, such as complementarity, redundancy or concurrency.

These interaction modalities may be a gesture, a key press, voice, look, etc. In current digital services, interpreting some modalities and deciding whether to merge them in order to deduce a single complete command, or several separate commands to be executed is known.

For example, as shown in FIG. 1, a user may give a voice instruction 100 to light a light at the same time as giving an instruction by gesture 110 by extending their arm towards the living room light. An entering interaction interpretation module 1, within the digital service, merges these two interactions, received from two input interfaces 10, 11 in order to decide on a single action of lighting only the living room light. This action is expressed in the form of a command 900 sent through an output interface 90.

Thus, as shown in FIG. 2, providing an entering interaction interpretation module 1 which serves to collect various modalities 100, 110, 120, 130 coming from a single user and received for example by a plurality of input interfaces 10, 11, 12, 13 is known. The entering interaction interpretation module 1 is capable of combining some entering interactions and deciding on distinct actions to implement by issuing independent commands 900, 910 through output interfaces 90, 91.

As shown in FIG. 3, the analysis of direct entering interactions, in some digital services, may be enriched by contextual information 50 coming from preceding direct or indirect interactions 500. Indirect interaction is understood to mean a detection by a digital service of information linked to the user without the user being aware of this interaction; it involves for example a presence detection in a room, detection of a leg in a cast, the noise level, brightness level, etc.

The processing of the cooperation of entering modalities coming from a single user with the method for merging is a fairly complex operation because each individual is unique and therefore interacts differently, according to the context, even by using the same interaction modalities for a single command.

Because of this, in current digital services, each direct entering interaction, also called intentional entering interaction, meaning issued with the intention of triggering a command, is associated in a simple case with a single command. Even in the most complex cases, where a request is formulated by a cooperation of entering modalities, this cooperation is individual and local.

Meaning that, as shown in FIG. 4, the cooperation is associated with a single user, who is the author of the set of modalities considered, and a single place, which corresponds to the area where this user is located.

In other words, when the first entering modalities are identified as coming from a first user and the second entering modalities are identified as coming from a second user distinct from the first user in particular by an identification module (not shown) receiving the first and second entering modalities, it is known to provide a first interpretation module 1 for interpreting the entering modalities coming from a first user and the second interpretation module 2 for interpreting the entering modalities coming from a second user, where the two interpretation modules operate separately and independently. Each interpretation module is dedicated to the interpretation of requests expressed by one specific user and for that purpose uses a given set of input and output interfaces.

Thus, according to FIG. 4, the first interpretation module 1 receives on entry, through input interfaces 10, 11, 12, 13, various first entering interactions 100, 110, 120, 130 with various first modalities, interprets them and on output issues commands 900, 910 through output interfaces 90, 91. Analogously, the second interpretation module 2 receives on entry, through input interfaces 20, 21, 22, 23, various second entering interactions 200, 210, 220, 230 with various second modalities, interprets them and on output issues commands 800, 810 through output interfaces 80, 81.

There is a need for an interactive environment capable of interacting simply, naturally and ergonomically not with a single user at a time, but with several users collectively. It would also be desirable that such an interactive environment be compatible with a distribution of users thereof on different sites.

SUMMARY

The present disclosure comes to improve the situation.

A processing method for a request for a digital service in an interactive environment is proposed, where the method comprises:
  generating an enriched request based on an interpretation of signals received from a multimodal set of human-machine interactions resulting from human-machine interactions coming from coordinated actions of a plurality of distinct users in the interactive environment, where each human-machine interaction, considered individually, is only indicative of one simple request and where the enriched request triggers sending at least one command.

The proposed method serves to improve the ergonomics of the digital service because it provides an effective consideration of linked multimodal interactions from distinct users. It thus contributes to reinforcing a natural and spontaneous behavior by the users of the digital service.

The expression "interactive environment" designates a set of human-machine interfaces allowing the interaction between the digital service and users thereof.

These human-machine interfaces comprise input and output interfaces. The input interfaces encompass for example a keyboard, a pointing system and/or a touchscreen. The output interfaces may include for example a screen or even a sound output coupled to a voice synthesis module. A head-mounted display is an example of a terminal comprising a set of movement sensors as an input interface and a display device as an output interface.

A camera coupled to an automatic gesture recognition module, or an interface using the voice as input member coupled with an automatic speech recognition module are other examples of input interfaces. The interactive environment may thus be, for example, integrated with a videoconferencing application using audio and video input interfaces for participants at a meeting. In this context, the digital service may rely on the interactive environment for automatically interpreting various types of signals corresponding to instructions provided jointly by the participants. These signals may for example designate a gesture from a first participant, an oral instruction from a second participant, an interaction with a button from a third participant, etc.

A request referred to as "simple" has an individual nature in that it may be determined from a single human-machine interaction coming from a single user. In contrast, a request referred to as "enriched" has a joint nature in that it can only be determined from a plurality of human-machine interactions arising, collectively, from distinct users. The proposed method may comprise a detection that received signals originate from distinct users.

Consider for example, an enriched request aiming to send an email to a group of users, a title for the email may be automatically proposed on the basis of the analysis of a direct interaction, for example text or voice, coming from a first user, whereas the content of the email may be determined on the basis of the analysis of another interaction coming from a second user. Thus, in this example, an enriched request is developed from two simple requests coming from two distinct users.

The method may further comprise an interpretation of the received signals determining the enriched request on the basis of at least one of the following elements:—simple requests extracted from the received signals;—for each of the received signals, the users originating the received signals;—the result of a detection that the received signals originate from distinct users. The interpretation may be implemented by a logic entity, here named signal analyzer or interpretation module. The analyzer may further comprise several elemental modules each exclusively interpreting signals which could have previously been associated with a user identified as the source of said signals by the indicated identification module. The analyzer serves as a generator for generating one or more enriched requests. This or these enriched requests automatically trigger commands corresponding to this or these requests.

In an example, the method comprises identification, for each received signal, of a user originating the received signal.

The identification may be a part of the interpretation of a received signal, for example voice signals may be analyzed for finding a voiceprint of a person. The identification may also be based on an identifier of a user originating a received signal; it may for example involve an IP address identifying a user connected individually to a digital service. With the identification, a given signal can be interpreted differently depending on the user identified as originating the signal. For example, an enriched request may be formulated based on both a first signal indicating a proposal to send a file to interested users and a series of second signals coming from distinct users each showing their interest in the proposal. A series of commands "send the file to X" may thus be sent, where X designates each identified user associated with at least one second signal.

Further, when several received signals are each associated with one identified user, the interpretation of a combination of said received signals may be done based on the identification of the users who are originating it. In that way merging entering modalities may be operated differently according to whether these entering modalities come from a single identified user or from several distinct identified users. In particular, an example may be considered where several linked modalities originating from a single identified user contribute, with one or more additional modalities originating from one or several distinct identified users, to the generation, by a generator, of an enriched request. In order to determine, in this example, whether these modalities originating from a single identified user are linked, it is possible for example to base it on a history of modalities coming from this identified user and extract therefrom a habit of temporal coordination constituting a characteristic specific to this identified user.

In an example, the at least one of said signals comprises a user identifier and generating the enriched request comprises at least one of the following steps:—generating the enriched request based on the interpretation of the received signals and the associated user identifiers;—generating the enriched request by adapting, according to user identifiers, the enriched request obtained by interpretation of the received signals.

In an example, at least one of said signals comprises contextual information and the generation of the enriched request adapts the enriched request based on an interpretation of this contextual information.

Consider for example an enriched request aiming to light a light among a set of lights, the exact identification of the light to be lit may be done on the basis of the low light intensity level detected in a given area. The low light-intensity level is here an example of contextual information which implicitly supplements an enriched request formulated by merging entering modalities and which thus contributes to interpreting signals received and to adapting the enriched request by the digital service.

Consider for example a user located in a noisy environment, isolating the voice of the user from the ambient noise may be intended in order to evaluate as potential voice instructions from the user only their own words and not those of some other person, located near the user but who is not themselves a user of the digital service. The ambient noise level is here an example of contextual information associated with an input interface receiving a human-machine interaction. This element as interpreted in this precise case in order to distinguish the signals received by this input interface and thus, more generally, to adapt the enriched request(s) coming from the coordination of the entering modalities.

Isolation of sounds coming from each user may also serve for example to find a plurality of sounds coming from a plurality of users using the same sound sensor attached to the same input interface. In other words, it is possible to isolate, in an entering audio flow, several sounds which could each contain a simple request while also identifying the author of each of the isolated sounds, for the purpose of generating an enriched request.

Contextual information may be associated with a user and may for example designate a preference or characteristic specific to the user, or even an indirect interaction of the user with the digital service. Contextual information associated with an input interface may for example designate the characteristics specific to a terminal and independent of the user, meaning shared by all signals received by the input interface from this terminal and that these signals come from a single user or instead from several distinct users. Generally, contextual information is digital data which can be used to help the interpretation of a direct interaction of the user with the digital service.

The digital data mentioned in the above examples, meaning the user identifier and the contextual information, are not necessarily directly included in one or more received signals but may more generally be obtained in any technically conceivable manner, whether that is in particular by a distinct transmission or by a determination, for example by interpretation of the received signals, such determination can be implemented locally, or centrally, or even using cloud computing means.

In an example, the proposed method further comprises time-stamping moments at least on beginning receiving of said signals, interpreting time gaps between moments of beginning respective reception of said signals, and adapting the enriched request based on the interpretation of these time gaps.

The temporal coordination of linked modalities, such as a gesture instruction coupled to a voice instruction, varies from one user to another. These differences could bear just as well on the length of each modality as a function of the user using it as on the synchronization of the modalities. Despite these differences, it is possible to define a threshold within which two modalities, in particular two different modalities, at least in that they come from distinct users, are deemed linked, meaning relating to the generation of the same enriched request. As a variant, it is possible to associate a time gap between the beginning of entering interaction modalities with a probability level these modalities are linked. In that way, a single final command may be obtained from a combination of a signal indicating a gesture instruction with a signal indicating a voice instruction, independently of the user who is the author of each instruction.

For example, at least one part of said received signals may come from a plurality of input interfaces distributed over various sites.

In that way, the proposed method allows users distributed over different sites, and each having at least one input interface, to act in coordination in order to formulate their intentions. The signals received by the input interfaces translate these intentions associated with distinct users. These combined signals are used by the digital service in order to formulate an enriched request corresponding to the intentions of the users and sending the command corresponding to the formulated enriched request.

For example, the proposed method may further comprise:
time-stamping the moments at least of beginning reception of said signals;
correcting the moments of beginning respective reception of said signals as a function of the latency between said sites;
interpreting corrected time gaps between corrected timestamped moments; and
adapting the enriched request depending on the interpretation of the corrected time gaps.

Thus, the proposed method incorporates the latency in communication between various sites. By synchronizing the time references of each user, the proposed method allows a better identification of coordinated modalities has been linked.

According to another aspect, a computer program is proposed comprising instructions for implementing the proposed method, when said instructions are executed by a processor.

According to another aspect, a device is proposed for processing a request for digital service in an interactive environment, where the processing device comprises at least one generator of an enriched request based on an interpretation of signals received from a multimodal set of human-machine interactions resulting from human-machine interactions coming from coordinated actions of a plurality of distinct users in the interactive environment, where each human-machine interaction, considered individually, is only indicative of one simple request and where the enriched request triggers sending at least one command.

The processing device may further comprise an analyzer able to interpret the received signals determining the enriched request on the basis of at least one of the following elements:
simple requests extracted from the received signals;
for each of the received signals, users originating the received signals.

The processing device may further comprise a user identifier able to identify, for each received signal, a user originating the received signal.

The processing device may be implemented for example in at least one device among the following:
a terminal;
a connected object manager able to command at least one object connected to a communication network by means of at least one command corresponding to the enriched request destined to at least one connected object.

For example, the processing device may comprise a processing circuit comprising a storage memory storing the proposed computer program and a processor connected to the storage memory and one or more terminal interfaces.

Alternatively, the processing device may be separated from such a processing circuit, which is then remoted and configured for exchanging with the processing device by means of the communication channel.

BRIEF DESCRIPTION OF THE DRAWINGS

Other characteristics, details and advantages will appear upon reading the following detailed description, and analyzing the attached drawings, on which.

DETAILED DESCRIPTION OF CERTAIN EMBODIMENTS

Figure 1:
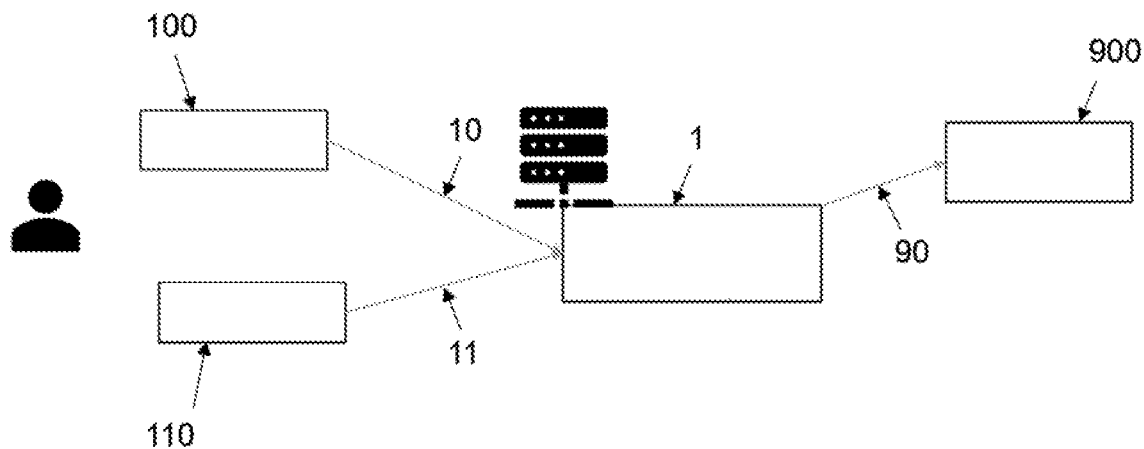
FIG. 1 shows known processing of a request arising from actions coming from a single user of a digital service, where two interaction modalities are merged in order to build one command.
Figure 2:
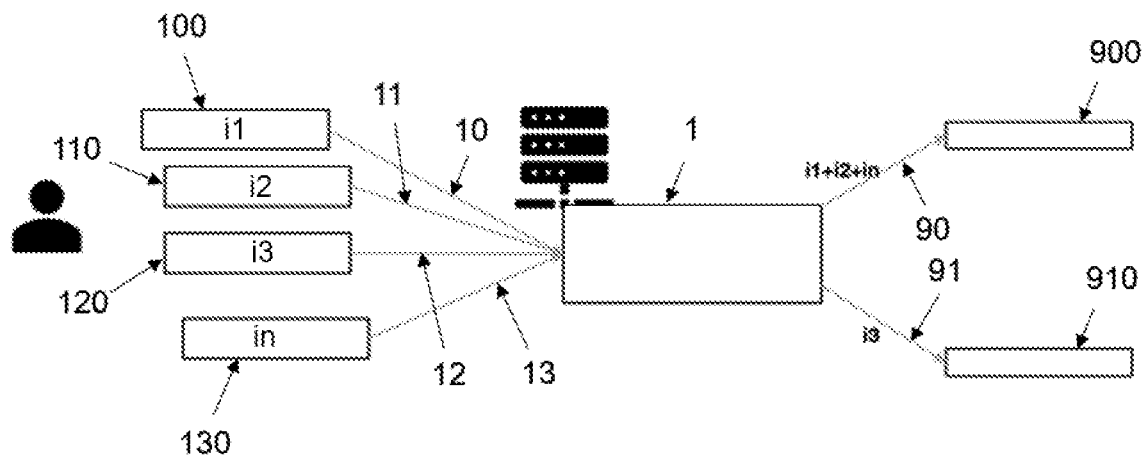
FIG. 2 shows a known variant of the processing from FIG. 1, where several interaction modalities are processed for constructing several commands.
Figure 3:
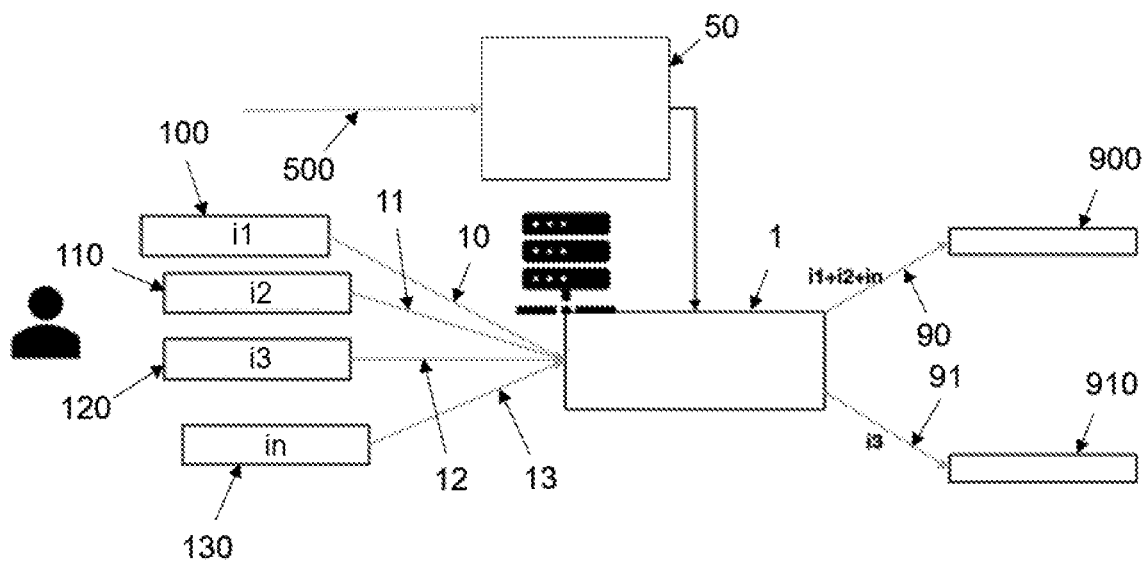
FIG. 3 shows a known variant of the processing from FIG. 2, where contextual data are considered for interpreting one or more entering interactions.
Figure 4:
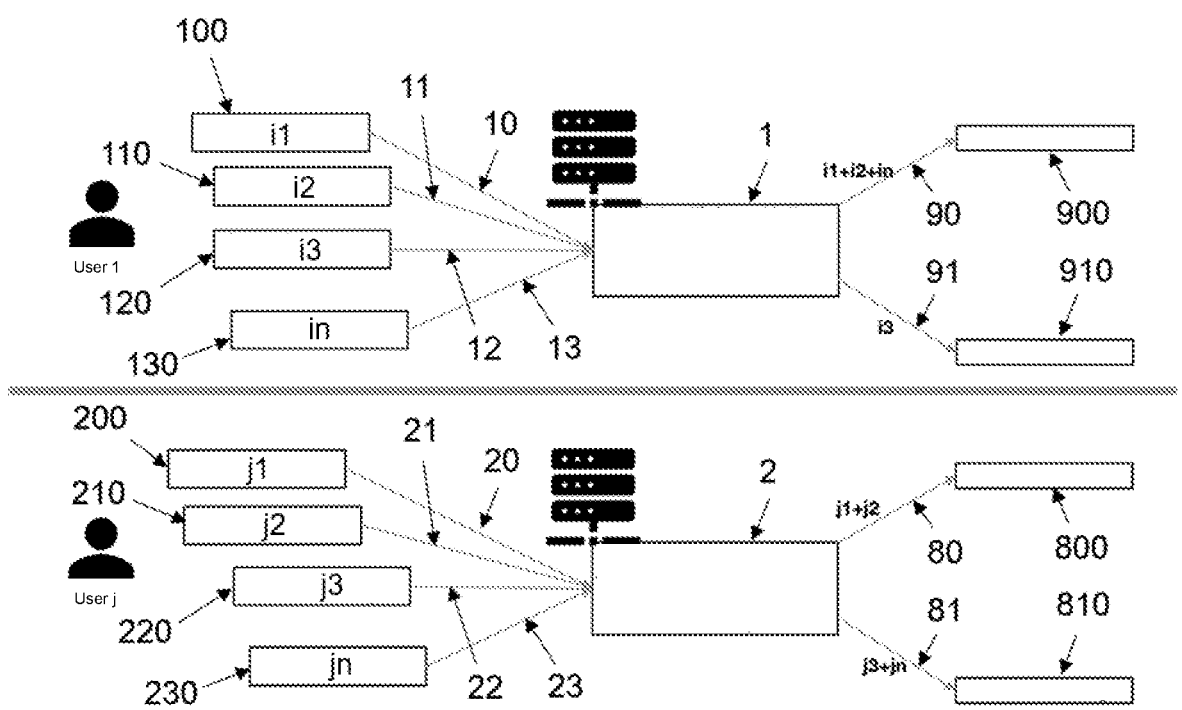
FIG. 4 shows known identical processing according to FIG. 1 done side-by-side. The processing each relates to a single user and is completely isolated from each other user, each processing relates to a distinct user arising solely from interactions for which this user is the originator and building of a distinct command.

The principle of the present development is to allow several users to interact together with a digital service, each according to the modality(ies) of their choice.

To do that, a digital service manages one or more input interfaces capable of gathering signals relating to a group of users, in particular the users are subscribed to the digital service. The users may indifferently all be in a single place or instead in areas separated from each other. The composition of the group of users is managed by the digital service itself according to its own rules and its own context. In an example, it may involve inhabitants of a house, using a household automation digital service. In another example, it may involve a set of people participating in a meeting by means of a digital videoconferencing service.

Each input interface is configured for collecting one or more signals relating to one or more users, such that the set of collected signals forms a multimodal set of interactions between distinct users and the digital service.

Optionally, the digital service manager may comprise a detector, intended for detecting whether the users originating the received signals are distinct. The detector may comprise a user identifier for identifying the users originating the received signals. Such a detection or identification may be done indifferently before or after receiving signals.

There are many possible ways to execute such a detection or identification.

For example, data with which to identify the users originating various received signals can be obtained directly from the input interface. In this document, such data are designated under the generic expression "user identifier." It may for example involve user account identifiers in the case where each user has their own account for using the digital service.

Alternatively, several received signals may be extracted for example from a single audio or video flow. An individual analysis of the extracted signals may be provided in order to identify the originating users thereof. A comparative analysis of the extracted signals by means of an ad hoc algorithm may also be provided in order to detect whether the users originating the extracted signals are distinct, without necessarily identifying the users in question.

A physical localization is another example of data which can be associated with the received signal and which may be used, at least in some cases, for the same goal of detecting whether the users originating various signals are distinct, there again without necessarily serving to formally identify, on its own, a given user.

Alternatively, it is conceivable that data serving to identify the users originating various received signals are compared to each other and that only the result of the comparison is obtained at the level of the digital service input interface. It is thus possible to detect whether various received signals come not from a single user but instead from distinct users based only on the results of the comparison and without it being necessary as such that the digital service manager identify the users.

The digital service is capable of interpreting the collected signals by detecting in them a cooperation of entering interaction modalities that are direct, successive or simultaneous, coming from several users. In this way, the digital service is able to generate an enriched request coming from several users based on merging interaction modalities each containing a simple request which is a fragment of this enriched request. Once the collective request is generated, a corresponding complete command is sent by the digital service through an output interface.

Generally and according to the principle disclosed, the present development proposes an enrichment of the user experience by possibilities of coordination with others even remotely, for helping, and by a better potential inclusivity of various user profiles. Thus, an enriched entering command, even explicit, also called entire or complete entering command, may be formulated indifferently by means of one or more interaction modalities, expressed by one or more users. The entering command is called explicit if merging the requests serves to remove one or more ambiguity(ies) compared to one of the so-called simple requests, for example a voice command of a first user such as "light the light" could be ambiguous, but merging it with a request from a second user resulting from a gesture from that second user showing a light would lead to a lighting command for the designated light which is therefore explicit. Just the same, if the light has a dimmer, the command is not explicit because no simple request serves to determine the expected light intensity level; it then involves an enriched but not explicit command.

Applications of the multimodality of interaction between several users and the digital service are multiple, as much in the public domain as in the professional domain. For example, a possible application in the work domain is triggering commands coming from several people in a meeting, whether on-site or remote. A possible application in the security domain is to require synchronized and multimodal interactions of several players for a single command. A possible application in enabling handicapped users is to assist several users in a restricted situation or to allow them to cooperate for triggering a command together.

Figure 5:
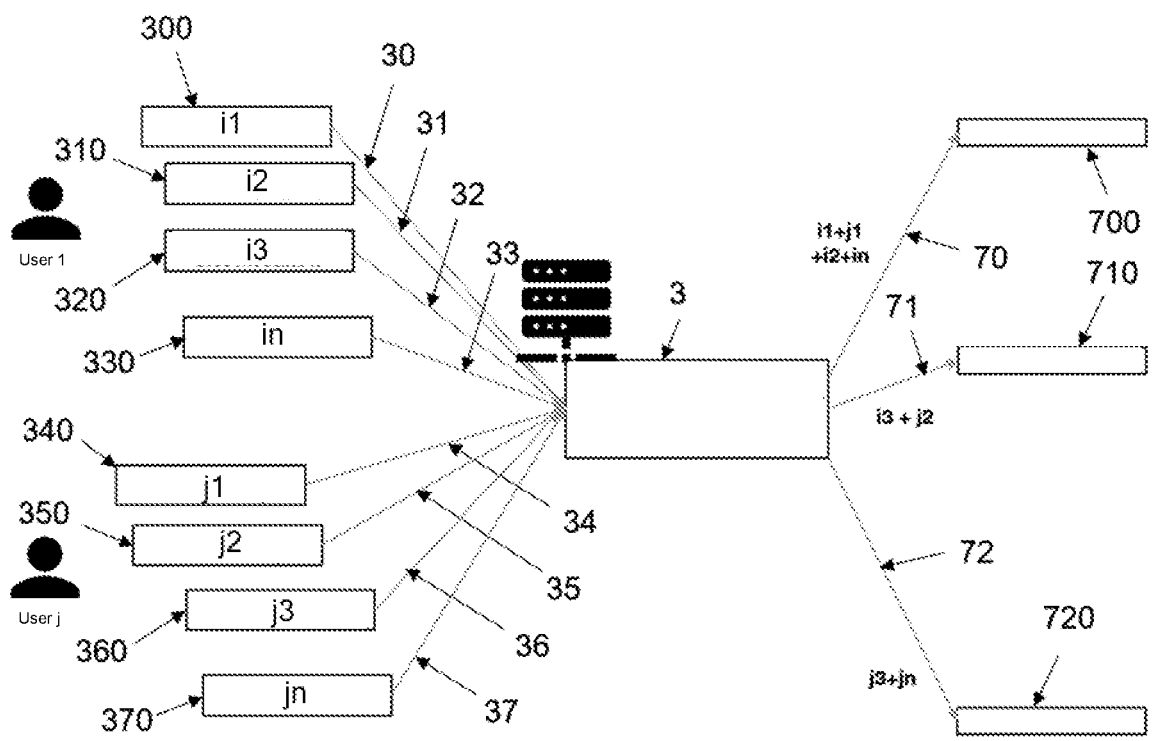
FIG. 5 shows processing of requests arising from coordinated actions of several users of the digital service, according to an implementation example.

Referring now to FIG. 5 which shows a software architecture of a digital service manager according to an implementation example of the development.

The digital service manager is understood as designating at least one processing circuit comprising a processor, storage memory, at least one input interface and at least one output interface. The digital service manager may be implemented, for example, in the terminal or in a connected object manager able to command at least one object connected to a communication network by means of at least one command corresponding to the enriched request destined to at least one connected object.

Computer program instructions are stored in the storage memory. When they are read by the processor, these instructions have the effect that the processor implements a method for processing a request based on a multimodal set of entering human-machine interactions.

The digital service manager comprises a generator (not shown) of an enriched request. It involves a software module able to generate an enriched request based on an interpretation of signals received from a multimodal set of human-machine interactions resulting from human-machine interactions coming from coordinated actions of a plurality of distinct users in the interactive environment, where each human-machine interaction, considered individually, is only indicative of one simple request. The enriched request triggers issuing one or more output commands through an output interface. Upstream from this generator, the digital service manager may also comprise an analyzer 3 or entering interaction interpretation module. It involves a software module configured for processing signals received by the input interfaces. These signals are indicative of the multimodal set of entering human-machine interactions.

The input interface(s) participate, from the perspective of a plurality of users, in forming an interactive environment.

This means that several users are each able to act on the operation of the digital service by means of at least one input interface.

For example, an interactive element may be displayed on a touchscreen, and it may be provided that a detection of pressing on this interactive element by a user leads to receiving a signal by an input interface. It is also provided that a user look in a specific direction in order to interact in a different way with the digital service, and that the detection of this direction of looking, by an appropriate sensor, leads to receiving another signal by an input interface. It may also be provided that a device worn by a user is geolocalized and that a specific location of the device leads to an input interface receiving another signal.

Generally, users may be equipped with terminals which may for example be a computer, a portable phone, a watch, a television. Optionally, a user might not have their own equipment, such that a single terminal may be used by several users, simultaneously or successively.

Each terminal may comprise one or more human-machine interfaces as sources of signals transmitted to an input interface associated with the analyzer 3. In this case, a human-machine interface of the terminal is, from the perspective of the user thereof, comparable to a simple proxy for an input interface in the interactive environment. Depending on the human-machine interfaces that it comprises and the use thereof, a single terminal may be limited to acquiring just one type of signal indicative of actions of only one user or may instead acquire several signals or types of signals indicative of actions of one or more users. When several users originate different received signals, interpretation of these signals may be intended in order to detect whether the users originating them are distinct. It is particularly important to perform such an interpretation when these signals are received by a single human-machine interface.

At least one terminal may further be configured for receiving and executing a command coming from an output interface associated with the generator.

The development is not limited in either the number or the kind of interfaces considered. It is only necessary that at least two signals be received where the first signal received is indicative of a human-machine interaction with a first user according to a first modality and where the second signal received is indicative of a human-machine interaction with a second user according to a second modality. Thus, using for example a single camera simultaneously recording two users, an audio track can be received comprising an oral instruction from the first user and a video track comprising a movement from the second user. The audio track and the video track thus form a set of received signals which is both multimodal and relating to multiple users. In this example, an analysis of the video track and/or the audio track may be implemented in order to identify the two users, in particular in the case where they are not interacting with a connected terminal identifying them, or in order to confirm an identification of the two users in the opposite case.

In the example from FIG. 5, several input interfaces 30, 31, 32, 33 each receive a signal indicative of an entering human-machine interaction 300, 310, 320, 330 from a single first user. Other input interfaces 34, 35, 36, 37 each receive a signal from an entering human-machine interaction 340, 350, 360, 370 from a single second user. In the interest of simplification, the modalities of the various received signals are considered to all be different. Of course, FIG. 5 is only illustrative, and in general several signals from one or several users may be received on the same interfaces.

The analyzer 3 identifies, among the received signals, human-machine interactions coming from coordinated actions of a plurality of users.

There are different ways of doing such an identification.

The identification of coordinated actions may be based exclusively on useful data contained in the received signals, meaning without referring to any metadata.

In this scenario, the analyzer 3 has no knowledge of the fact that the human-machine interactions are in fact from a plurality of users. Processing of the received signals therefore amounts here to merging different interaction modalities, independently of the user at the origin of each, in order to formulate a request and send a command. In other words, in this scenario, a command resulting from merging modalities will always be determined identically by the analyzer 3, independently of the fact that the modalities considered come from a single user or instead from a plurality of users.

In an example, the digital service manager comprises a user identifier (not shown) able to identify, for each received signal, a user originating the received signal. This identification may be done by means of an analysis of each received signal by voice recognition, for example. The identification of a received signal may also be done by retrieving an identifier from the user. In particular, received signals may contain a user identifier. This may be explicitly in the content itself (text format, audio, image, etc.), or then by the transport channel itself associated with a user identifier (IP address for example). The user identifier has an additional effect of allowing the digital service manager to determine not only whether a set of received signals relates to a single unique user or in contrast to distinct users.

The analyzer 3 may thus be configured for formulating a request that is differentiated according to whether the request is simple or enriched.

As shown in FIG. 5, several entering interactions 300, 310, 330, 340 within a multimodal set of human-machined interactions can be identified by the analyzer 3 as resulting from coordinated actions of several users of the digital service. The analyzer merges these interactions in order for the generator to generate a collective request for these users or enriched request. The enriched request thus generated then triggers the preparation of a command 700 corresponding to this collective request and this command is sent through an output interface 70.

In the same way, the analyzer 3 may estimate that, still within the same multimodal set of human-machine interactions, several other entering interactions 320, 350 also result from coordinated actions and correspond to another collective request from several users. In this case, an order 710 is sent distinctly, either by the same output interface as before, or by a distinct output interface 71.

The analyzer 3 may also estimate that, still within the same multimodal set of human-machine interactions, other entering interactions 360, 370, result for their part from coordinated actions of a single user, and correspond to an individual request from that user. In this case, the analyzer 3 prepares a command 720 corresponding to that individual request and sends this command by any appropriate output interface 72.

As already indicated, the formulation of collective or individual requests, in general, does not necessarily demand consideration of any metadata.

Just the same, the time dependence of the interactions, the receiving context thereof and the identification of their authors are as many examples of data which may be included in the received signals and for which automatic processing may serve to improve the formulation of requests and formulate possible additional requests.

In order to simply present these different data and the manner in which processing thereof may influence the formulation of requests, a specific example of modalities and a formulated enriched request which follow from it are now considered.

In this specific example, a first user verbally requests starting the heating in a room, whereas a second user gestures towards a radiator. The microphone records an audio flow containing the request from the first user and a camera records a video flow containing the request of the second user. These two flows are received by an input interface and processed by the analyzer 3.

In the absence of additional data, the analyzer 3 is only able to coarsely formulate a request consisting of activating a heating system in a room, without knowing precisely what room. The analyzer 3 may optionally overcome this difficulty by inviting one or more of the users to clarify their request, for example by naming the room or by selecting it among a list of suggestions.

The contextual information is a particular type of supplemental data for which the automatic processing may influence the formulation of requests. In that way, at least one of the received signals may comprise contextual information 60 which is interpreted by the analyzer 3 in order to improve the formulation of a request.

Continuing the specific example, it is possible to consider that the location of the camera filming the second user is already known. This localization may for example take the form of an identifier of a room, which is previously associated with an identifier of the camera, in a database of received signal sources.

In that way, the interpretation by the analyzer 3 of the received signals containing the video flow and the identifier of the camera may comprise an interaction with the database of received signal sources on the basis of the identifier of the camera contained in the received signal.

Such an interaction may allow the analyzer 3 to obtain the identifier of the room where the users wish to get, collectively, an activation of the heating. The identifier of the room may therefore be used for supplementing the enriched request, here more specifically by correctly identifying one or more specific heating devices to start. Additionally, the direction of the arm extended by a user, such as can be analyzed in the entering video flow, is a form of simple request with which to identify a specific heating device to be activated and thus contributing to generating the enriched request as merging two simple requests, one in voice signal form and the other in gesture signal form.

Figure 6:
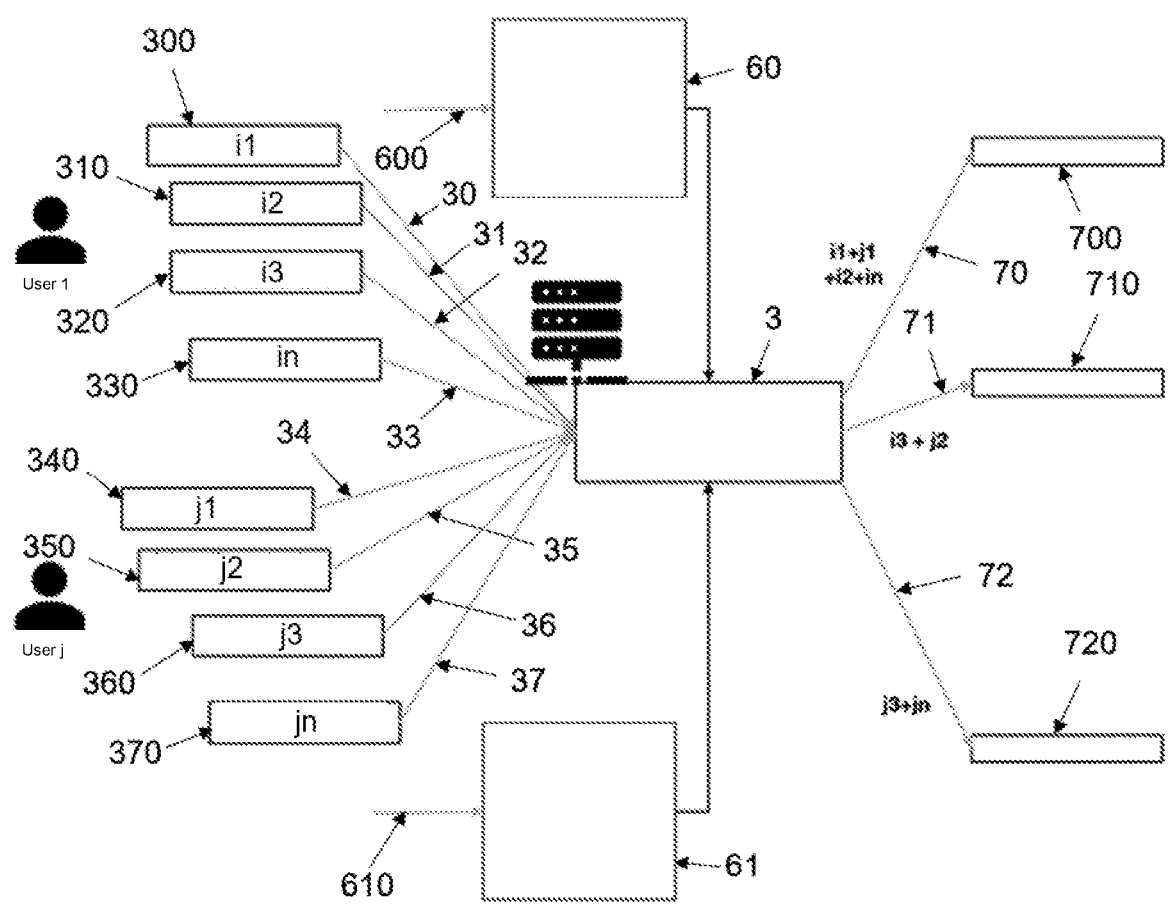
FIG. 6 shows a variant of the processing from FIG. 5, where contextual data are considered for interpreting one or more entering interactions.

Generally, contextual information 60 such as shown in FIG. 6 may relate to one or several aspects among the sound, light or temperature level or any other parameter relating to any kind of characteristic of a user, their environment, or a data source used by the user and serving to acquire one or several signals received by the analyzer 3.

Thus defined, contextual information 60, 61 obtained by the analyzer 3 translates a set of indirect actions 600, 610 with the digital service, in contrast to direct interactions, which are those intentionally shown by the users.

Since the users are distinct and their positions at the moment of the interactions are also potentially different, different received signals may naturally contain different contextual information.

Unlike known devices and methods implementing mergers of modalities coming from a single user, here it is useful that the analyzer 3 is able to integrate contextual information 60, 61 distinguished by user, doing so in order to be able to correctly interpret the context of obtaining different modalities coming from distinct users.

The user profiles are another particular type of supplemental data for which the automatic processing may influence the formulation of requests.

Using a history of requests, in particular provided to the analyzer 3, and/or generated by the analyzer 3 itself in particular by keeping all or part of the associated signals and requests in memory, can be planned.

A history of request may for example comprise:
both, sets of received signals, each comprising at least one signal corresponding to an action of a user and having served to formulate at least one request;
and also, for each set of received signals, one or more commands sent downstream on the basis of the formulated request.

The analyzer 3 may be configured for searching, in such a history, for signals similar to one of the signals recently received, and for consulting, for each of the signals present in the history, the commands actually sent downstream.

Such a step, whose practical implementation involves training an artificial intelligence according to generally known principles, may allow improving the formulation of a request, for example by choosing to repeat or adapt specific request formulations having already been used in the past based on similar received signals.

The method may also call for getting an element from a profile associated with a user having generated one of the human-machine interactions and/or with at least one input interface receiving one of the human-machine interactions.

For example, the history of requests previously described may be listed by user so as to personalize the coverage of the previous requests in the formulation of a current request.

Returning to the previous example of two users issuing the collective request to heat a room, the analyzer 3 may also get or infer the preferences of at least one of the users involved so as to improve the formulation of the request by opting for example for a personalized temperature in the room.

In general, a user profile element designates any past form of interaction, direct or indirect, between the user and the digital service, which is interpretable by the analyzer 3 in order to improve the formulation of a request.

The user identifier, already mentioned, is a specific example of a user profile element. A potential use of a user identifier in this context may be to supplement the formulation of a vague request. For example, during a videoconference meeting, an example request coming from presenters, automatically identified by their user identifiers, may be to mute the microphones of other participants on the videoconference. With the user identifiers of presenters, the analyzer can improve the formulation of the request and deduce by elimination the list of participants whose microphones must be muted.

The time dependence of the interactions, which may for example encompass the length of each interaction or the time gap between the beginnings of two interactions, is an additional element which could affect the detection of linked interactions and the formulation of requests.

Consideration for this time dependence is even more complex since each user does not act with the same speed or the same precision.

Take the example of a command to light the living room light detected by the cooperation of the following two interaction modalities:

By voice: "light the light"

By gesture: the arm of the user extended towards the living room light.

The command to be performed can be defined just by the merging of these two interaction modalities.

Figure 7:
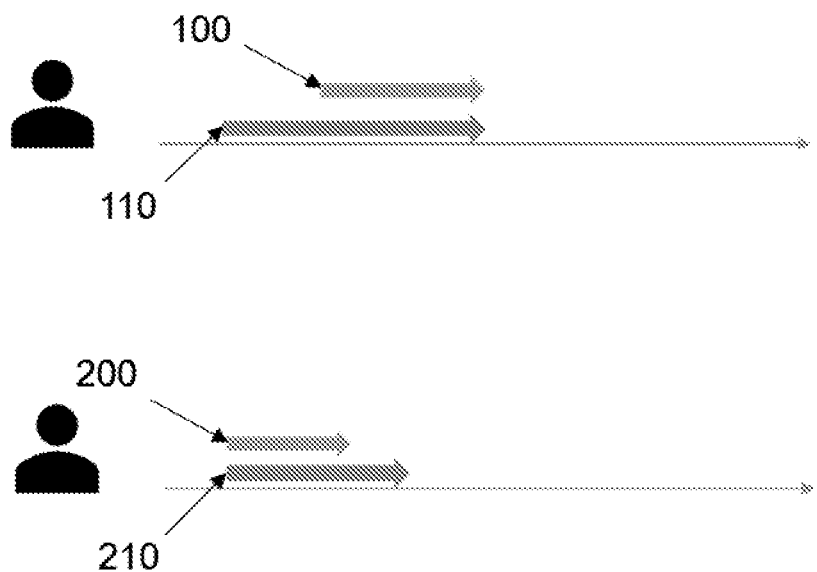
FIG. 7 shows the differences of coordination of linked modalities for one given individual request according to the author thereof.

Hence, one user may be quicker than another, with a different coordination of the linked modalities, even though the command to be found really is the same. This phenomenon is shown in FIG. 7, where the length and synchronization of the linked modalities 100, 110 coming from a first user are different than those 200, 210 coming from a second user. The modalities 100, 200 are vocal whereas the modalities 200, 210 are gestural. They are represented in FIG. 7 in the form of temporal arrows, one modality starting at a moment corresponding to the origin of the arrow and finishing at a later moment corresponding to the tip of the arrow. Although the two modalities used by distinct users do not have the same length nor the same synchronization, the anticipated final command is identical in the two cases.

Modalities coming from several users in parallel do not necessarily have to be considered by the analyzer 3 in the same way as linked modalities coming from a single user.

In fact, repetitions of interaction modalities by a single user are not equivalent to identical interaction modalities coming from several users. In the first case, there is an idea of redundancy or insistence whereas in the second case it involves a single instance or a request shared by users.

Figure 8:
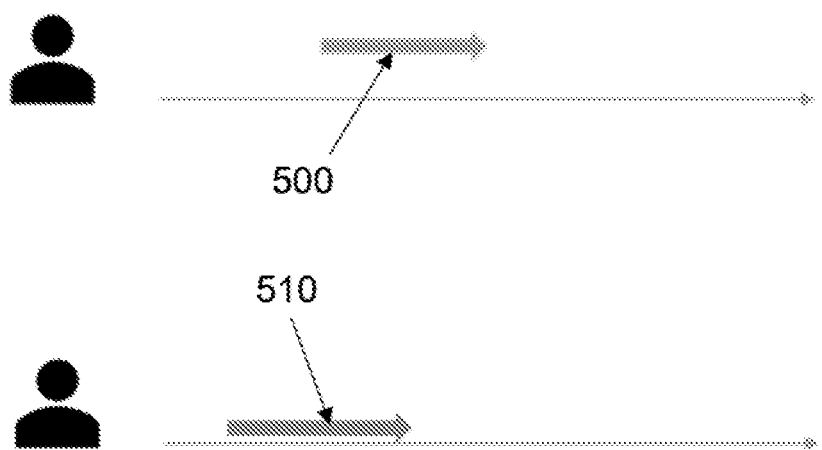
FIG. 8 shows an example of coordination of linked modalities for a given collective request.

For example, as shown in FIG. 8, when two users perform at the same time, or close together in time, the two modalities 500, 510 in cooperation: in voice "light the light" and with the gesture of the arm extended towards the conference room light, it does not mean to light this light twice, but to light it once, and since two people want this, it may mean insistence or a real, shared need.

For example, the signals received comprising the voice information from one user and the gesture information from another user may each comprise at least one time-stamp for interaction beginning and optionally a time-stamp for interaction ending or equivalently an interaction length.

Generally, by an interpretation of the time-stamped signals, in particular by an interpretation of time gaps between the beginning or end of one interaction and the beginning or end of another interaction, it is possible to determine for example whether these interactions are superposed, close or separated in time, and on this basis to determine whether these interactions are related or not.

The time is also an essential element in the determination of the type of cooperation between several interaction modalities, in particular complementarity or redundancy. In that way, processing by the analyzer 3 of the time-stamped moments relative to linked interactions offers the possibility of interpreting a given interaction modality in light of another interaction modality preceding it.

By considering several linked interaction modalities, the first interaction modality, on the temporal plane, may for example define an initial request from a user, possibly incomplete, whereas each following one comes to clarify the meaning by transforming it into a collective request involving several distinct users. In that way, consideration of the time dependence of the interactions, and in particular the order thereof, by the analyzer 3 contributes to reconstituting the logical path of the users and thus to transcribe faithfully some collective requests.

When the received signals come from different sites because the users are themselves located at different sites, then it is possible that the latency between these sites has an impact on the time gaps. In this case, synchronizing the time references relative to a single arbitrary event (for example following a triggered event such as a ping) in each time reference. This synchronization may lead to correcting time-stamps done separately at each site before proceeding with the interpretation of the time-stamped signals.

Conversely, processing of a merger arising from interaction modalities of several users may bring together for several commands one of the modalities coming from one of the users to be combined with each of the modalities from other users. For example in a single room, when one user says "light these lights," whereas a second user points to the ceiling light, and the third user points to the lamp on the table, two commands must be issued from merging these modalities, specifically a first command for lighting the ceiling light in the second command for lighting the lamp on the table.

Two specific examples of applications of the development are now described.

Figure 9:
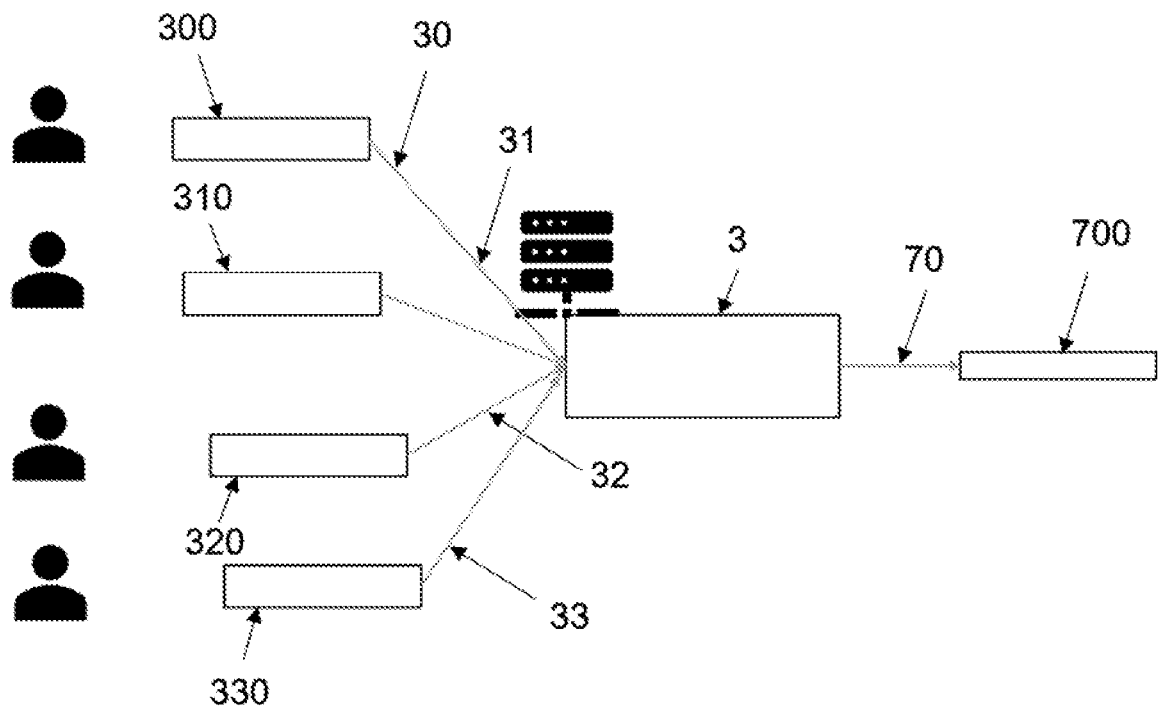
FIG. 9 shows a specific example of processing of specific interaction modalities, according to the general principle from FIG. 5, for building a specific command.

In the first specific example shown in FIG. 9, Peter is in a meeting with his colleagues. With his laser pointer, he points at one of the filenames displayed on the slide being shown and says, "open this file." The service merges the two interaction modalities "name written on the panel and pointed" and voice "open this file," and from this deduces the command "open the file xxx," where xxx is read on the panel by means of a camera which detects the targeted name.

The following week, after Patrick breaks his arm, he is at home and participating in the meeting remotely. His colleague, present at the meeting, manipulates the laser pointer, and directs it at the file to be shown at the same time as Peter says, "open this file." This time, the service merges the two different interaction modalities coming from two users of the meeting to deduce from them that the complete command is "open the file xxx."

At the end of the meeting, he adds orally: "send the file by mail to those who want it" while his colleague again points to the filename. Some of the people raise their hand, others cry out "yes, me" or "yes, I want it." By using the video flows from the various connected PC cameras remote or present in the room, the service detects the raised hands of the various users. The digital service also detects, by using the microphones of the connected computers and by using the microphone and camera of the meeting room, the people who responded with an equivalent of "yes" whatever the modality.

The service thus merges the directly entering interaction modalities coming from the group of participants in the meeting and deduces from that the order to send the file pointed out on the list to the people who responded positively one way or another.

Figure 10:
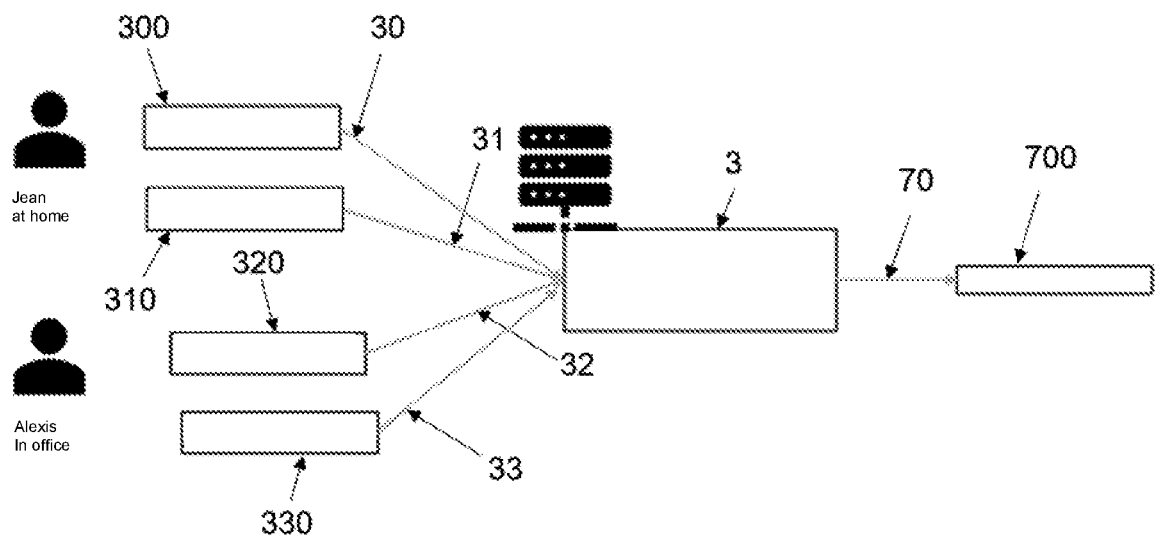
FIG. 10 shows another specific example of processing of specific interaction modalities, again according to the general principle from FIG. 5, for building a specific command.

In a second specific example shown in FIG. 10, Jean and Alex use a digital floor-plan tool for their future house. Jean says, "put that" then with her finger clicks on an object shown on the screen, and Alex responds by saying "here" and tapping with his finger on a location on the floor plan of the house. This evening they are together in the living room, but tomorrow could continue their digital layout while he is at work and she is at home, all while keeping the same possibility for cooperation of the interaction modalities.

The invention claimed is:

1. A processing method for a request for a digital service in an interactive environment, where the method comprises:
    generating an enriched request based on an interpretation of signals received from a multimodal set of human-machine interactions resulting from human-machine interactions coming from coordinated actions of a plurality of distinct users in the interactive environment, where each human-machine interaction, considered individually, is only indicative of one simple request and where the enriched request triggers sending at least one command; and
    detecting that the received signals originate from distinct users.

2. The method according to claim 1, where the method comprises an interpretation of the received signals determining the enriched request on the basis of at least one of the following elements:
    simple requests extracted from the received signals;
    for each of the received signals, users originating the received signals; and
    the result of a detection that the received signals originate from distinct users.

3. The method according to claim 1, wherein the method comprises identification, for each received signal, of a user originating the received signal.

4. The method according to claim 1, wherein the at least one of the signals comprises a user identifier and generating the enriched request comprises at least one of the following:
    generating the enriched request based on the interpretation of the received signals and the associated user identifiers; and
    generating the enriched request by adapting, according to user identifiers, the enriched request obtained by interpretation of the received signals.

5. A processing method for a request for a digital service in an interactive environment, where the method comprises:
    generating an enriched request based on an interpretation of signals received from a multimodal set of human-machine interactions resulting from human-machine interactions coming from coordinated actions of a plurality of distinct users in the interactive environment, where each human-machine interaction, considered individually, is only indicative of one simple request and where the enriched request triggers sending at least one command,
    wherein, when at least one of the signals comprises contextual information, the generation of the enriched request adapts the enriched request based on an interpretation of the contextual information.

6. A processing method for a request for a digital service in an interactive environment, where the method comprises:
    generating an enriched request based on an interpretation of signals received from a multimodal set of human-machine interactions resulting from human-machine interactions coming from coordinated actions of a plurality of distinct users in the interactive environment, where each human-machine interaction, considered individually, is only indicative of one simple request and where the enriched request triggers sending at least one command, further comprising:
    time-stamping the moments at least of beginning reception of the signals;
    interpreting time gaps between moments of beginning respective reception of the signals; and
    adapting the enriched request based on the interpretation of these time gaps.

7. A processing method for a request for a digital service in an interactive environment, where the method comprises:
    generating an enriched request based on an interpretation of signals received from a multimodal set of human-machine interactions resulting from human-machine interactions coming from coordinated actions of a plurality of distinct users in the interactive environment, where each human-machine interaction, considered individually. is only indicative of one simple request and where the enriched request triggers sending at least one command,
    wherein at least one part of the received signals may come from a plurality of input interfaces distributed over various sites.

8. The method according to claim 7, further comprising:
    time-stamping the moments at least of beginning reception of the signals;
    correcting the moments of beginning respective reception of the signals as a function of the latency between the sites;
    interpreting corrected time gaps between corrected time-stamped moments; and
    adapting the enriched request depending on the interpretation of the corrected time gaps.

9. A processing circuit comprising a processor and a memory, the memory storing program code instructions of a computer program for executing the processing method according to claim 1 when the computer program is executed by the processor.

10. A processing device for a request for a digital service in an interactive environment, where the processing device comprises:
    a generator of an enriched request based on an interpretation of signals received from a multimodal set of human-machine interactions resulting from human-machine interactions coming from coordinated actions of a plurality of distinct users in the interactive environment, where each human-machine interaction, considered individually, is only indicative of one simple request and where the enriched request triggers sending at least one command; and
    a detector that the received signals originate from distinct users.

11. The processing device according to claim 10, wherein the processing device comprises an analyzer able to interpret the received signals determining the enriched request on the basis of at least one of the following elements:
    simple requests extracted from the received signals; and
    for each of the received signals, users originating the received signals.

12. The processing device according to claim 11, wherein the processing device comprises a user identifier able to identify, for each received signal, a user originating the received signal.

13. The processing device according to claim 10, wherein the processing device is implemented in at least one device among the following:
   a terminal; and
   a connected object manager able to command at least one object connected to a communication network by means of at least one command corresponding to the enriched request destined to at least one connected object.

14. A processing device for a request for a digital service in an interactive environment, where the processing device comprises:
   a generator of an enriched request based on an interpretation of signals received from a multimodal set of human-machine interactions resulting from human-machine interactions coming from coordinated actions of a plurality of distinct users in the interactive environment, where each human-machine interaction, considered individually, is only indicative of one simple request and where the enriched request triggers sending at least one command,
   wherein, when at least one of the signals comprises contextual information, the generator of the enriched request adapts the enriched request based on an interpretation of the contextual information.

15. A processing device for a request for a digital service in an interactive environment, where the processing device comprises:
   a generator of an enriched request based on an interpretation of signals received from a multimodal set of human-machine interactions resulting from human-machine interactions coming from coordinated actions of a plurality of distinct users in the interactive environment, where each human-machine interaction, considered individually, is only indicative of one simple request and where the enriched request triggers sending at least one command;
   a time-stamp module for time-stamping the moments at least of beginning reception of the signals;
   an interpretation module for interpreting time gaps between moments of beginning respective reception of the signals; and
   an adaptor module for adapting the enriched request based on the interpretation of these time gaps.

16. A processing device for a request for a digital service in an interactive environment, where the processing device comprises:
   a generator of an enriched request based on an interpretation of signals received from a multimodal set of human-machine interactions resulting from human-machine interactions coming from coordinated actions of a plurality of distinct users in the interactive environment, where each human-machine interaction, considered individually, is only indicative of one simple request and where the enriched request triggers sending at least one command,
   wherein at least one part of the received signals can come from a plurality of input interfaces distributed over various sites.

* * * * *